United States Patent [19]
Zenos

[11] 3,734,740
[45] May 22, 1973

[54] CONTINUOUS FOOD COOKING DEVICE

[76] Inventor: Steven Zenos, 1520 Sagebrush Trail, S.E., Albuquerque, N. Mex.

[22] Filed: May 24, 1971

[21] Appl. No.: 146,157

[52] U.S. Cl. .......................99/1, 99/107, 99/339, 99/342, 99/355, 99/421, 99/427, 99/443 C
[51] Int. Cl. ..............................A23l 1/31, A23l 1/00
[58] Field of Search........................99/342, 343, 285, 99/339, 340, 355, 421, 426, 427, 443 C, 1, 107, 157; 126/388; 73/344; 340/309.4

[56] References Cited

UNITED STATES PATENTS

| | | | |
|---|---|---|---|
| 2,259,073 | 10/1941 | McGlaughlin | 99/427 |
| 2,452,657 | 11/1948 | Hooper | 99/443 C X |
| 2,470,446 | 5/1949 | Rankin | 99/443 C X |
| 2,856,507 | 10/1958 | Naxon | 99/342 X |
| 2,898,845 | 8/1959 | Dight | 99/343 UX |
| 3,270,661 | 9/1966 | Juvan | 99/343 |
| 3,309,982 | 3/1967 | Surks | 99/420 |
| 3,338,156 | 8/1967 | Angelos | 99/427 |

Primary Examiner—Billy J. Wilhite
Assistant Examiner—Arthur O. Henderson
Attorney—Wesley B. Taylor

[57] ABSTRACT

A conveyor moves a train of food items, particularly meat items mounted on skewers, at a substantially constant rate past a heat source of substantially constant intensity toward a discharge point where the food items are collected. The conveyor has indicia marked along the path it traverses indicating predetermined starting points on the conveyor for the food items. The indicia correlate the distances from the starting points to the discharge point with an identifying characteristic of a food item first entered on the conveyor at such starting points, for example, the type of food to be cooked, the extent it is to be cooked, and the like. Preferably, detachable skewer means support the food items on the conveyor and have indicia cooperating with the indicia spaced along the path of travel of the conveyor.

21 Claims, 9 Drawing Figures

Patented May 22, 1973  3,734,740
2 Sheets-Sheet 1
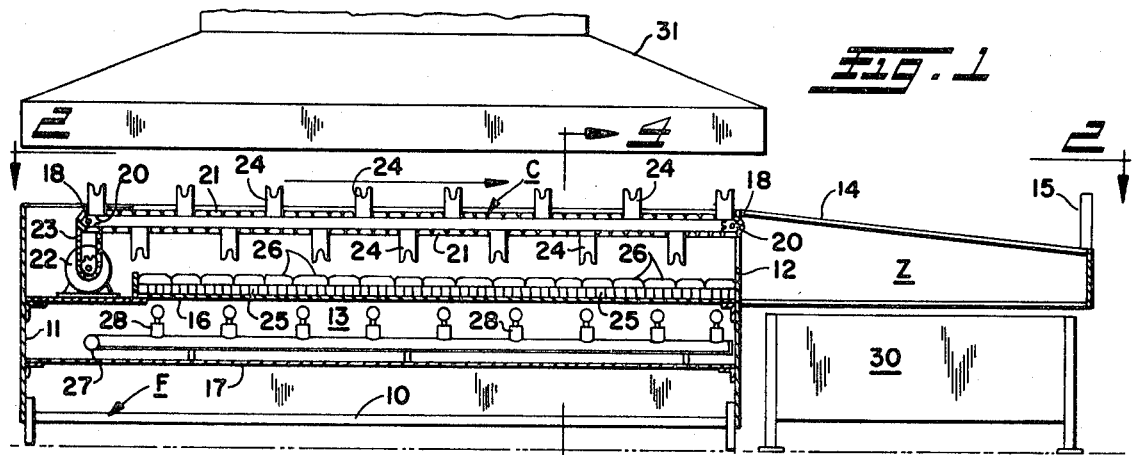
Fig. 1
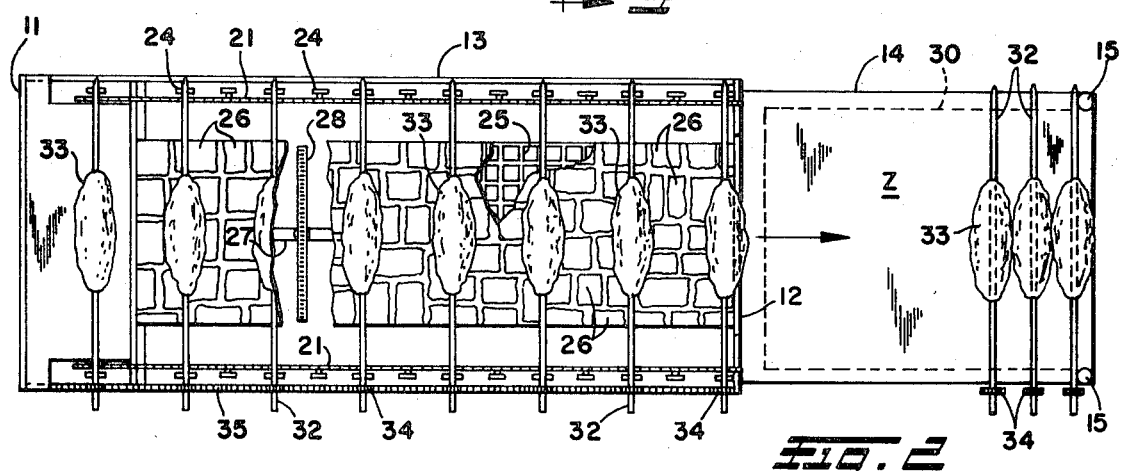
Fig. 2
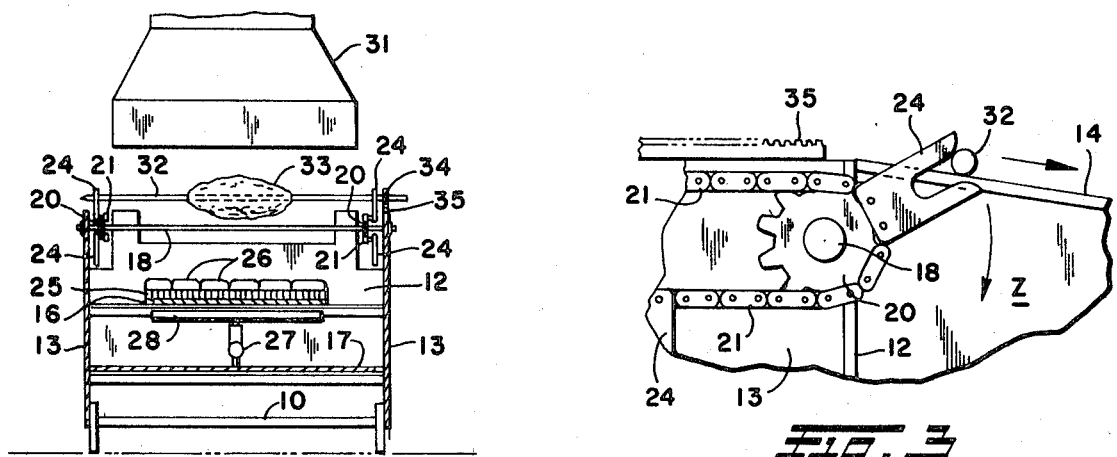
Fig. 4
Fig. 3
INVENTOR.
STEVEN ZENOS
BY Bosworth, Sessions,
Herrstrom & Cain
ATTORNEYS Patented May 22, 1973

INVENTOR.
STEVEN ZENOS
BY Bosworth, Sessions,
Herustrom & Cain
ATTORNEYS 3,734,740

CONTINUOUS FOOD COOKING DEVICE

BACKGROUND OF THE INVENTION

All restaurants have the dual, related problems of serving food relatively promptly to a customer and cooked to the proper degree and taste as ordered by him. The so-called "fast-food" outlets and franchises which have become so popular and accepted particularly accentuate these problems.

Characteristically, a restaurant has short periods of time, such as the noon hour, when it is extremely busy separated by relatively longer periods of inactivity. It is difficult for a chef to fill a large number of orders within a short space of time and even more difficult to insure that at least a large number of the food orders are cooked reasonably close to the manner of preparation requested by customers. In practice, orders frequently are not filled properly and, during the press of filling and delivering many orders, waitresses often serve orders to the wrong diners. Further, since the volume of orders that can be handled by the usual staffs within a restaurant is definitely limited, it also happens that unserved customers leave rather than wait unduly for service, resulting in loss of sales to a restaurant.

Moreover, orders that are placed often are not prepared in the manner requested, for example, anywhere from rare to well done in the case of meats. In part, this is due to the rush of orders and limited cooking facilities such that a well-done meat item is served in a medium-done condition. But failure to cook food items as ordered is also due to the non-uniform treatment and varying cooking skills of the chefs who process the food. The degree of cooking as observed by the eye is largely a matter of judgement in which not all agree. Accordingly, even should an order be placed and later delivered to the rightful diner, it is not unusual for the diner to be dissatisfied with its manner of preparation.

It would, therefore, advance the art to provide means for cooking food items quickly in order to provide an increased, rapid turnover operation, and yet one which also uniformly cooked the food to a degree desired, whatever it may be, and one which insured serving the food to the diner who ordered it.

SUMMARY OF THE INVENTION

The present invention provides a continuous, sequential flow of food items along a predetermined path of travel past a heat source to a release or discharge point under conditions of substantially constant rate of travel and substantially constant heat intensity, so that the length of travel time as measured from the discharge point imparts an identifying characteristic to the food item such as the degree of cooking desired or necessary. To render the operation completely uniform and to provide reproducible results, regardless of the personnel involved, indicia are marked along the path of travel indicating predetermined points of initial entry for various food items. These indicia are placed so that the distance from the discharge to a selected indicia bears a relationship to the characteristic of the food item, usually after it has been cooked.

Preferably, an endless conveyor transports the food items seriatim along their path of travel, and skewers on the conveyor support the food items with respect to the conveyor. The skewers may be detachably mounted on the conveyor and released with their food items after a single pass along the heat source to be temporarily collected with other food-bearing skewers. For this purpose, the skewers preferably also have indicia which cooperate with the indicia marked along the path of travel of the conveyor to indicate a characteristic identification of the food item. These characteristic identifications include, for example, the type of food item treated, such as beef as opposed to pork, the degree to which the item has been cooked, customer-identification, and the like.

BRIEF DESCRIPTION OF THE DRAWINGS

The accompanying drawings illustrate a presently preferred embodiment in which:

FIG. 1 is a side elevational view of one form of the conveyor cooking apparatus, one side of a supporting framework being removed for purposes of illustration;

FIG. 2 is a plan view of FIG. 1 on the plane of the line 2—2 and shows several food-supporting skewers in place;

FIG. 3 is an enlarged, fragmentary view of a discharge station at the right-hand end of the conveyor as viewed in FIG. 1 and illustrates the release of skewers and their food items from the conveyor;

FIG. 4 is a cross-sectional view of FIG. 1 on the line 4—4;

DESCRIPTION OF THE PREFERRED EMBODIMENTS

Structure

Figure 5:
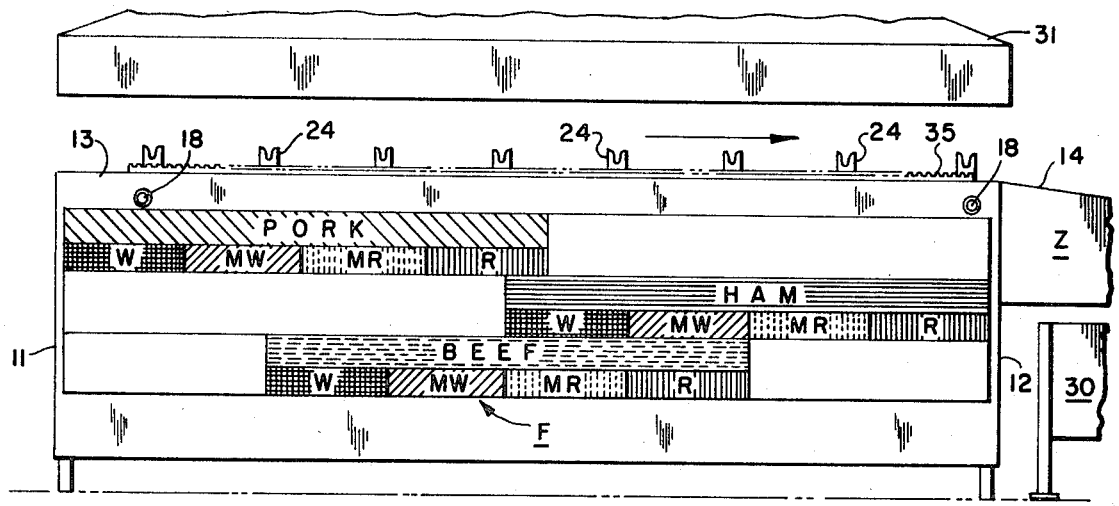
FIG. 5 is an enlarged side, elevational view of the conveyor of FIG. 1 and shows indicia placed along a side of the conveyor.

Referring to the drawings, a framework generally indicated at F comprises a sturdy, rectangular base 10 supporting rear and forward end plates, 11 and 12, respectively, and two parallel side plates 13 which extend forwardly and terminate in downwardly slanting edges 14 (FIG. 1) having spaced, upstanding stop rods 15. A pair of shelves 16 and 17 is secured to the end plates 11 and 12 as by angle irons, rigidifying the structure and supporting other structural parts as hereinafter described.

A pair of shafts 18 is suitably mounted for rotation in the side plates 13. Each shaft has two fixed, spaced apart sprockets 20. A link chain 21 is trained around aligned sprockets for each shaft to define a conveyor generally indicated at C. The chains are translated by conventional means, the upper flight traveling to the right as viewed in FIG. 1. For example, an electric motor 22 supported by shelf 16 drives the rearward shaft 18 by a conventional sprocket and chain drive, represented at 23, that is connected to a sprocket (not shown) on the rearward shaft 18. The chains 21 should be driven at a substantially constant rate of speed. To this end, motor 22 may be a synchronous motor. Other types of speed control means may be used such as speed governors.

A series of U-shaped skewer supports 24 is fixed as by rivets to each chain 21. The facing edges of the fingers of the U-shape are reversely curved as shown in FIG. 3 to facilitate entry and release of a skewer. The supports 24 are uniformly spaced along each chain 21 and aligned transversely of the conveyor chain with like supports of the other chain.

A heat source of substantially constant intensity is mounted adjacent the conveyor chains 21 and adapted to radiate heat toward the space between the chains over an appreciable length of the travel of the upper flight. In the embodiment shown, shelf 16 supports an open grid or grate 25 carrying a number of refractory rocks 26 which are capable of being heated to high temperatures without damage and then to radiate heat into a cooking zone or region between the chains 21. The refractory rocks 26 substantially cover the perforate bottom of the grate 25.

The embodiment shown includes gas burners to heat the rocks 26. A main gas manifold 27 enters laterally of the framework F and extends longitudinally (FIG. 4) of the grate 25 to feed a series of transversely disposed, standard gas burners 28. The heat generated should be substantially uniform. This is one reason refractory rocks 26 are preferred rather than exposing food items to the bare, fluctuating gas flame. The rocks tend to radiate heat more uniformly. However, standard gas pressure regulators can be installed in the manifold 27 to aid in providing a constant throughput of combustible gas and in this manner assist in providing uniform heat. Similarly, oil burners and an oil feed can be used. Alternatively, electrical heaters may be employed in which the temperature is controlled by known thermostatic means. A warming oven 30 is placed in a collecting zone Z and below the forward ends of side plates 13 (FIG. 1). Preferably the warming oven is a standard infrared heating unit. A vent 31 carries away cooking odors and heated vapors.

Indicia stationed along the path of travel of the conveyor C indicate a plurality of predetermined starting points for the food items, such indicia correlating the distance from such starting points to the end of the conveyor with an identifying characteristic of a food item first started on the conveyor at such predetermined starting points. FIG. 5 illustrates a variety of such starting points for different food items. In this case, three different meats are considered, namely, pork, ham, and beef, although other food items could be represented. For each meat, points of entry are indicated relative to the final degree of cooking sought. For example, reading in a direction toward the exit end of the conveyor C, there are for each meat areas indicating "W" or "well done"; "MW" or "medium well done;" "MR" or "medium rare;" and "R" or "rare." Even within each area there is dome latitude in which one has a choice at which precise point the meat should first be placed.

To facilitate recognition, the type of meat may be indicated by color indicia. Thus, in FIG. 5, port is indicated by the color green; ham, by blue; and beef, by silver. Similarly, the various entry points on the conveyor for each meat are shown by color. The degree of cooking of "well done" is indicated by the color gold; "medium well done," by the color brown; "medium rare," by the color violet; and "rare," by the color red.

Figure 6:
FIG. 6 is an enlarged view of a skewer piercing a food item and ready to be mounted on the conveyor of FIG. 1.

Skewer or spit means are adapted to receive and support food items with respect to the conveyor and preferably are detachably mounted on the conveyor. FIG. 6 illustrates one type of skewer comprising a stake or rod 32 which pierces a food item 33. The ends of the stake 32 drop between the fingers of the U-shaped skewer supports 24. Preferably, the skewers rotate as they move along the conveyor. This may be accomplished by a gear 34 fixed to the skewer which engages a rack 35 (FIGS. 2 and 3) extending along an upper edge of one of the side plates 13 of the supporting framework. The simultaneous rotation of the skewers as they move along the path of the conveyor makes it possible to brown the food item evenly while subjecting a meat, for example, to a self-basting action.

Preferably, the skewer stake 32 also carries indicia which may cooperate with the indicia stationed along the path of travel of the conveyor. In the embodiment of FIG. 6, the skewer has a clip 36 holding an order slip 37 indicating any of several data, such as the type of meat, degree to which it is to be cooked, or customer table or name. In some cases it is preferred to serve the food item with the skewer attached, as a "kebab," for example. The skewer can, therefore, comprise a portion containing the food that is adapted to be separated from the remainder of the skewer such as a gear 34. In the embodiment of FIG. 6, the skewer is severable at 38. A press-fitting sleeve 39 normally holds the two parts together.

Figure 7:
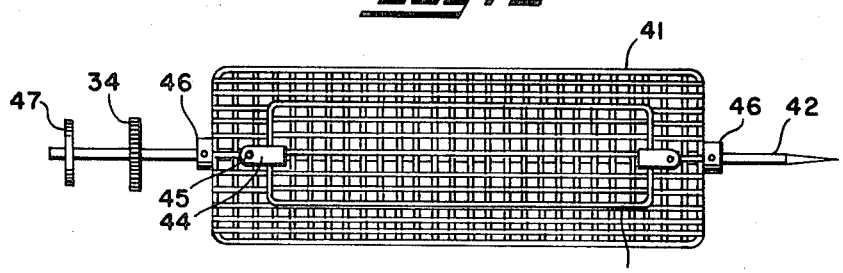
FIG. 7 is an enlarged view of a modified form of a skewer that may be used.
Figure 8:
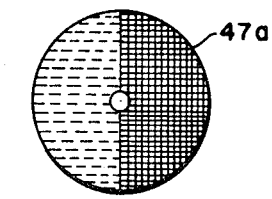
FIG. 8 is a left-hand end view of the skewer of FIG. 7 and shows one form of indicia that may be used on the skewer.

As shown in FIG. 7, the skewer may also be in the form of a basket 41 when the food item cannot be conveniently held by impaling only. In this embodiment, a skewer 42 passes through the open, wire basket having a door panel 43 of like structure. A pair of tabs 44 are pivotally connected by pins 45 to the basket and hold the panel 43 in place when turned to cover it as shown in FIG. 7. Collars 46 with set screws hold the basket 41 in place on the skewer 42. The embodiment of FIG. 7 also has a turning gear 34 like the embodiment of FIG. 6, but the indicia in FIG. 7 which cooperate with the indicia along the conveyor is of different character. This embodiment has an indicia disc 47 which may be like that of FIG. 8 or FIG. 9. The disc 47a of the embodiment of FIG. 8 uses only color indicia which correspond to the color indicia shown in FIG. 5. For example, one-half of the disc 47a is colored silver and the other half is colored gold. This disc therefore indicates that the meat on the skewer is beef that is to be or has been cooked to a well done state. The disc of FIG. 8 can, if desired, be divided into still other color segments to indicate still further data.

Figure 9:
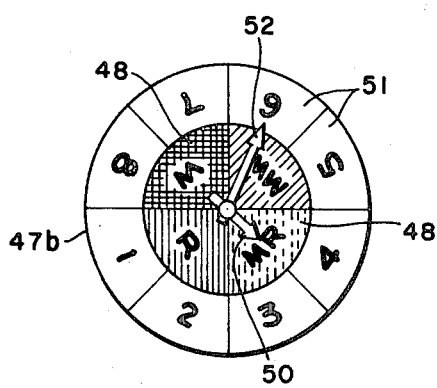
FIG. 9 is a left-hand end view of a skewer, as viewed in FIGS. 6 or 7, and illustrates still another form of indicia that may be used on a skewer.

The indicia disc 47b of FIG. 9 combines color, letters, and numerical indicia. The inner four quadrants 48 are lettered "W," "MW," "MR," and "R" with correspondingly colored backgrounds as indicated and described in connection with FIG. 5. If desired, either the letters or the colors alone can be used. A short pointer 50 pivoted to the disc can be placed in any quadrant to indicate a selection. Around the outer circumference of the disc of FIG. 9 there are areas 51 numbered 1 through 9. The numbers can designate, for example, a customer or table number. A pointer 52 pivoted to the disc can be placed in the area of any selected number. The data communicated by the disc of FIG. 9 is that the food item is to be or has been cooked to a medium rare state and is to be delivered to table, customer, or seat number 6. Alternatively, the color background of the quadrants 48 can be used to indicate the type of meat as in FIG. 5, and the letter relied upon to indicate the extent of cooking.

Operation

Although the invention is described in connection with the preparation and serving of meats, it is understood that the invention is adapted for the cooking, roasting, or broiling and basting of many other food items such as fowl, fish, sausages, weiners, corn-on-the-cob, and the like. Similarly, meat can be in various forms such as hamburgers, steaks, strips pieced together, etc.

Preferably, when a series of like food items is to be cooked to order, the items are similarly sized to be substantially equal in weight and shape as a further aid to uniform results. After the conveyor chains 21 are moving at a substantially constant rate of travel and the rocks 26 are radiating a substantially constant intensity of heat, the apparatus is ready for use. A food item is mounted on a skewer, such as the skewers of FIG. 6 or FIG. 7, and the skewer then placed in opposed supports 24 on the conveyor C and at a selected distance from the right-hand end of the conveyor as viewed in FIG. 1. The skewers rotate while they are translated along a conveyor and make a one-pass trip along the upper flight to be released from the supports 24 as the latter round the sprockets 20 at the downstream end. FIG. 3 represents this action. The ends of the skewers simultaneously leave the supports 24 and ride the sloping edges 14 aided by their momentum and gravity until they strike the stop rods 15 or a previously discharged cooked item as illustrated in FIG. 2. The oven 30 keeps the food items warm until they are picked up for serving.

The skewers need not contain indicia of their own as long as they can be individually identified. Since a number of cooked food items may accumulate over the warming oven 30, it is preferred that the skewers have identifying indicia, such as that illustrated by FIGS. 8 and 9. Such indicia not only aids a cook or chef in knowing where to place the skewer (according to the order), but also aids a waitress in knowing where the cooked food item is to be served after she has collected it from zone Z.

To illustrate a specific example, assume a waitress receives an order from customer or seat 8 for a well done strip steak. She selects an indicia disc like that of FIG. 8 and places it over the end of the skewer having the proper meat item. Or she may use the indicia disc of FIG. 9 after moving pointer 50 to "W" and pointer 52 to 8. After noting the indicia on the skewer, a chef waits until two aligned supports 24 reach the "BEEF" and "W" areas of FIG. 5 and then drops the skewer into the supports. Even though this skewer may be mixed with other skewers having different food items differently cooked in collecting zone Z over the edges 14, the waitress can readily pick up her order and deliver it to the proper customer.

The present invention enables the consistent cooking of a relatively large volume of food items over a relatively short period of time by reason of the continuous flow of the food items over a heat source of substantially constant intensity. A minimum of labor is involved. The speed of translation along the conveyor and the heat provided by the heat source are correlated, so that by the time the food item reaches the exit end of the conveyor, it has been cooked to a desired degree. Several of the units of the present invention may be used, such as in a restaurant, each operating at a different rate of translation. This enables several people in one party to obtain their food at about the same time, even though one wished his food well done and the other ordered it rare.

Each modification may be used alone or in combination with one or more of the other modifications. Although the foregoing describes several presently preferred embodiments of the present invention, it is understood that the invention may be practiced in still other forms within the scope of the following claims.

I claim:

1. Apparatus for cooking sequentially supplied food items comprising a conveyor adapted to support and carry the food items along a predetermined path to a discharge station, means to move the conveyor at a substantially constant rate along said path, a heat source of substantially constant intensity mounted adjacent the conveyor and adapted to radiate heat toward the food items on the conveyor over an appreciable length of said path, indicia stationed along the path indicating a plurality of predetermined starting points for the food items, said indicia correlating the distance from said starting points to the discharge station with an identifying characteristic of a food item first started on the conveyor at said predetermined starting points, and food-carrying means on said conveyor for supporting said food items with respect to the conveyor having indicia cooperating with said indicia stationed along said path.

2. The food cooking apparatus of claim 1 in which said food-carrying means includes skewer means adapted to receive and support said food items with respect to the conveyor.

3. The food cooking apparatus of claim 2 in which said skewer means comprises a spit adapted to pierce a food item.

4. The food cooking apparatus of claim 1 in which said food-carrying means are detachably mounted with respect to the conveyor.

5. The food cooking apparatus of claim 1 in which said food-carrying means is pivotally carried on the conveyor, and turning means along said path is adapted to engage and pivot the food-carrying means as said means is carried by the conveyor.

6. The food cooking apparatus of claim 1 in which said food-carrying means comprises basket means adapted to contain a food item.

7. The food cooking apparatus of claim 1 in which said food-carrying means comprises a portion containing the food and adapted to be separated from the remainder of the food-carrying means for serving with the food item.

8. The food cooking apparatus of claim 1 in which said food-carrying means is releasably mounted on the conveyor to receive and support said food items, said conveyor being adapted to release said food-carrying means at the discharge station, said discharge station having means to collect said food-carrying means after its release from the conveyor.

9. The food cooking apparatus of claim 8 including a warming oven mounted adjacent said discharge station to maintain a food item carried by the collected food-carrying means in a warm condition prior to its distribution.

10. The food cooking apparatus of claim 1 in which said heat source comprises refractory rocks disposed adjacent the conveyor, and fuel-fired burner means to heat the rocks.

11. The food cooking apparatus of claim 1 in which said identifying characteristic of a food item so correlated by the indicia along said path is the extent to which it is cooked.

12. The food cooking apparatus of claim 1 in which said identifying characteristic of a food item so correlated by the indicia along said path is an identification of the type of food item.

13. The food cooking apparatus of claim 1 in which said indicia of the food-carrying means indicates a customer-identification of a food item.

14. The food cooking apparatus of claim 1 in which said food-carrying means has two sets of indicia, each cooperating with the indicia along said path, one set cooperating with said path indicia to identify a characteristic of the food item, and the second set of indicia cooperating with said path indicia to provide customer-identification of the food item.

15. The food cooking apparatus of claim 1 in which said indicia along said path comprises color indicia, and said indicia of the food-carrying means comprises color indicia cooperating with said color indicia of said path, predetermined color combinations of the two sets of indicia serving to identify a characteristic of the food item.

16. The food cooking apparatus of claim 15 in which said food-carrying means has two color indicia cooperating with color indicia along said path, one color indicium on the food-carrying means indicating the type of food item being cooked, and the other color indicium on the food-carrying means indicating the extent to which said food item is cooked.

17. In the process of cooking sequentially supplied food items by moving a train of the items seriatim along a path past a heat source to a discharge point; the improvements comprising moving the food items at a substantially uniform rate, maintaining the heat source at a substantially constant intensity, marking indicia along said path at varying distances from said discharge point to define a plurality of predetermined starting points for said food items, said indicia correlating the distance from said predetermined starting points to the discharge point with a desired identifying characteristic of the food item, and introducing a food item into said train at a starting point having an indicium indicating a characteristic desired for said food item.

18. The process of claim 17 including providing said food items with indicia having a cooperating relation with said indicia along said path.

19. The process of claim 18 in which said cooperating relation of the indicia indicates the extent to which a food item is cooked.

20. The process of claim 18 in which said cooperating relation of the indicia indicates the type of food item cooked.

21. The process of claim 18 in which said cooperating relation of the indicia indicates a customer-identification of the food item.

* * * * *